United States Patent
Bingham et al.

(10) Patent No.: US 11,847,740 B2
(45) Date of Patent: Dec. 19, 2023

(54) DATA COMPRESSION ALGORITHM FOR PROCESSING OF POINT CLOUD DATA FOR DIGITAL TERRAIN MODELS (DTM)

(71) Applicant: DATASIGHT, Las Vegas, NV (US)

(72) Inventors: Luke Bingham, Phoenix, AZ (US); Alexander Ivey, Nederland, CO (US)

(73) Assignee: DATASIGHT, Las Vegas, NV (US)

( * ) Notice: Subject to any disclaimer, the term of this patent is extended or adjusted under 35 U.S.C. 154(b) by 15 days.

(21) Appl. No.: 17/397,257

(22) Filed: Aug. 9, 2021

(65) Prior Publication Data
US 2022/0051475 A1   Feb. 17, 2022

Related U.S. Application Data

(60) Provisional application No. 63/064,494, filed on Aug. 12, 2020.

(51) Int. Cl.
*G06T 17/05* (2011.01)
*B64C 39/02* (2023.01)
*B64U 101/30* (2023.01)

(52) U.S. Cl.
CPC ............ *G06T 17/05* (2013.01); *B64C 39/024* (2013.01); *B64U 2101/30* (2023.01); *G06T 2200/04* (2013.01); *G06T 2200/08* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,144,896 A * | 11/2000 | Kask | ................... | G05B 19/4099 700/165 |
| 2007/0291994 A1* | 12/2007 | Kelle | ..................... | G01C 11/00 382/110 |
| 2012/0032962 A1* | 2/2012 | Yeh | ........................ | G06T 11/203 345/441 |
| 2013/0085018 A1* | 4/2013 | Jensen | .................. | A63F 13/812 473/404 |
| 2015/0379767 A1* | 12/2015 | Inoue | ........................ | G06T 5/20 382/154 |
| 2017/0083763 A1* | 3/2017 | Zang | ........................ | G01S 17/89 |

(Continued)

OTHER PUBLICATIONS

Bourennane, E. et al. "Generalization of Canny-Deriche Filter for Detection of Noisy Exponential Edge" Signal Processing 82; 1317-1328; 2002.

(Continued)

*Primary Examiner* — Kent W Chang
*Assistant Examiner* — Jonathan M Cofino
(74) *Attorney, Agent, or Firm* — Jason H. Vick; Sheridan Ross, PC

(57) ABSTRACT

An unmanned aerial vehicle (UAV) or unmanned surface vessels (USV) collect electro-optical images, LiDAR or sonar to create a three-dimensional (3D) point cloud referenced to a geodetic datum. The resulting point cloud is a digital surface representation of the earth's surface. The process of the geospatial cleaning and point cloud compression entails cleaning of the point-cloud surface and to the automated extraction of a set of 3D vector polylines and mass points. The resultant electronic file retains the details of the bare-earth point-cloud with an approximate 10× compression in file size or more.

6 Claims, 6 Drawing Sheets

(56) References Cited

U.S. PATENT DOCUMENTS

2017/0200309 A1* 7/2017 Qian ..................... G06T 15/04
2018/0218535 A1* 8/2018 Ceylan .................. G06T 17/20

OTHER PUBLICATIONS

Ju, C. et al. "An Edge-Enhanced Modified Lee Filter for the Smooting of Sar Images Speckle Noise" International Workshop on Acoustic Signal Enhancement, NF, Canada, 1981.

Weil, Jerry "The Synthesis of Cloth Objects" ACM; Dallas; vol. 20; Nov. 4, 1986.

Widiarti, Anastasia Rita "Comparing Hilditch, Rosenfeld, Zhang-Suen, and Nagendraprasad—Wange-Gupta Thinning" World Academy of Science, Engineering and Technology; vol. 5; Jun. 28, 2011.

* cited by examiner

DATA COMPRESSION ALGORITHM FOR PROCESSING OF POINT CLOUD DATA FOR DIGITAL TERRAIN MODELS (DTM)

CROSS REFERENCE TO RELATED APPLICATIONS

The present application claims the benefit of and priority, under 35 U.S.C. § 119(e), to U.S. Provisional Application Ser. No. 63/064,494, filed on Aug. 12, 2020, entitled "DATA COMPRESSION ALGORITHM FOR PROCESSING OF POINT CLOUD DATA FOR DIGITAL TERRAIN MODELS (DTM)." The entire disclosure of the application listed above is hereby incorporated by reference, in its entirety, for all that it teaches and for all purposes.

FIELD

The present disclosure relates to data processing and, more particularly, to processing a point cloud and more particularly to processing and usage of data collected from imagery, LiDAR and/or sonar to create a three-dimensional (3D) point cloud.

BACKGROUND

Digital Elevation Models (DEM) and Digital Terrain Models (DTM) represent the cornerstone of digital land surface terrain mapping. Opposed to Digital Surface Model (DSM), a DEM or DTM has natural, non-ground surface features (such as plants, trees, grasses) as well as anthropogenic surface features (such as buildings, vehicles, surface infrastructure) removed, leaving a "bare earth" topography.

DEM is typically a raster-based representation of the terrain (bare-earth) with elevations at regularly spaced intervals (e.g., grid cells or pixels). DSM is also a raster dataset containing elevation values at regularly spaced intervals; however, the elevation values represent the first surface feature detected by the sensor. These first returns may be reflected by bare ground or by surface features such as trees and structures.

A DTM is a further refinement of a DEM where elevation values can be regularly or irregularly spaced providing a more efficient surface representation (i.e., relatively planar areas have fewer points than rugged areas). Furthermore, abrupt land topography surface features like ridges and valleys are defined by irregular three-dimensional (3D) breaklines. As used herein, the term "breakline" or "break line" refers to lines or piecewise groupings of lines that are used in software (e.g., Computer Aided Design (CAD) models) to create a visual model of the ground. Breaklines may facilitate or assist with the understanding of the smoothness and/or continuity of the terrain over which the breaklines extend or span by representing a boundary between two regions of a surface where there is an abrupt change in slope. The size/length of the boundary is in no way limited, and may be represented by two points, but may alternatively continue across, for example, thousands of points. DTMs are preferred over DEMs for civil, mining and construction as they provide a more efficient, smaller file size that allows them to be used in CAD software interfaces that provide real-time, on-the-fly design tools like cut-fill, road design, drainage, etc.

Commercial land development, mining and civil infrastructure require highly accurate DTMs to engineer grading plans and surface water drainage systems. DTMs are essential in flood plain mapping, reservoir design, road construction, gas transmission and power transmission, just to name a few. DEM topography is available from public sources such as the U.S. Geological Survey (USGS), but the resolution is limited to a maximum resolution of 20-foot contour interval and is unsuitable for detailed engineering design that requires a contour interval of 1-foot. The scale of the DEMs can vary from a few acres to entire continents depending on the resolution required for the specific topographic mapping product.

One of the current methods to create a DTM is to use manned survey in order to collect a grid (e.g., 50-foot grid) of horizontal and vertical elevation points registered to a known geodetic datum across a site. These measurements are supplemented with irregular horizontal and vertical elevation points that define breaklines along trenches, ridges, roadway gutter definitions, etc.

A second current method to create a DTM is to use aerial imagery and structure from motion (SFM) software to create a 3D point cloud of the site terrain and supplement the raster elevations with manually placed 3D breaklines. This method is commonly used to create flood plain maps where highwater channels need to be defined by breaklines.

The current DTM-generation processes are manually intensive and/or time consuming, requiring extensive labor on the processing of large point clouds.

Automated processing of the SFM and generation of point clouds is currently available. These methods do not fully remove the surface features to create the bare-earth topography and use a raster- or mesh-based contouring process that results in overly large and cumbersome electronic files.

Automated processing of LiDAR and sonar point clouds is currently available. These methods do not fully remove the surface features to create the bare-earth topography and use a raster- or mesh-based contouring process that results in overly large and cumbersome electronic files.

The processing associated with the preparation and insertion of breaklines is an extreme laborious and manual process that can take many human hours to process and requires great skill of the operator. The automated process of cleaning the point cloud to bare earth and creating breaklines saves enormous time of skilled operator labor and allows rapid production of maps in hours that previously took weeks or more. In at least one embodiment, the point cloud cleaning may occur on the scale of minutes (e.g., one minute, two minutes, five minutes, etc.).

Conventional systems fail to provide and are unable to provide a quick and efficient solution to providing real-time or near-real-time DTM of a scanned landscape.

SUMMARY

As described herein, a compressed DTM may be created within a short period of time based on captured images, LiDAR, or sonar, such that a user (e.g., an engineer, a construction worker, etc.) can access the recent scans or images to view the immediate area for the purposes of, for example, engineering grading planning, topographic land development, land zoning, combinations thereof, and/or the like.

As an example, with conventional systems, the quickness of zoning or other land development planning may take the span of days or weeks. The DTM may take days or even weeks of processing before being capable of providing relevant data to an engineer, which may push back or otherwise delay project development. This may have negative consequences for the engineer, the client, or the role of local business in the development of the land. In contrast to conventional techniques, the present disclosure at least permits for improved speed in DTM processing, such that a drone can be used to capture images, and a completed DTM can be rendered in a CAD software program and displayed to a user (e.g., the engineer) on the same day. This quick processing beneficially enables the widening of the bottleneck often associated with DTM construction associated with the land development process and greatly improves efficiency.

As discussed herein, the processing associated with the DTM to take the raw imagery, LiDAR, or sonar data and produce a DTM cannot be practically performed by a human in the short time window (e.g., a day) that may be required in keeping with a land surface terrain mapping for land development projects (e.g., commercial land development, mining, civil infrastructure). Furthermore, rather than automate a manual task, the present disclosure creates a novel approach to land development and infrastructure planning by drastically reducing timelines by producing a DTM (which may be used for planning purposes) within a day.

At least some embodiments disclosed herein relate generally to the use of an unmanned aerial vehicle (UAV) to collect data associated with a site using an image sensor, or light detection and ranging (e.g., LiDAR using one or more lasers).

As used herein, "UAV" includes, but is not limited to, an Unmanned Aircraft System (UAS) as that term is used by the Federal Aviation Administration (FAA) for commercial drones.

In some embodiments herein, image sensors relate to geo-spatial positioning, such as an image sensor augmented by Global Positioning System (GPS) ground points and structure-from-motion process (SFM) to geo-reference data to UTM, state plane and other coordinate control basis.

Some aspects relate to topographical mapping using imagery from electro optical sensors and LiDAR sensor technology.

Some aspects relate to bathymetric LiDAR or sonar data.

Some aspects relate to bare-earth point cloud files and methodology to reduce electronic file size through lossless compression processing algorithm.

At least some of the embodiments disclosed herein relate to the general process of CAD software, or Graphical Information Systems (GIS) software to create topographic contour maps.

As related to the use of UAVs to collect imagery data for DTMs, the process contained herein is primarily related to development of high-resolution digital topography for commercial land development, mining, construction, and civil infrastructure. For example, the size of the land imaged or otherwise scanned may be 0.5 acres, 10 to 1,000 acres, 2,000 acres, 5,000 acres, 7,000 acres, 10,000 acres, 15,000 acres, etc. However, the size of the terrain imaged is in no way limited in range, and any acre size may be scanned Systems and methods for an unmanned aerial vehicle (UAV) or unmanned surface vessel (USV) to configure and/or use on-board sensors to collect data associated with site topography, followed by processing of such data into a DTM, are described herein. Some embodiments are summarized in this section.

In one embodiment, the method includes evaluation and calculations based on data associated with a point cloud. A point cloud is an assemblage of thousands to billions of individual points as a "cloud" of points usually positioned in 3D space and having a set of coordinates (x, y, z). These sets of points normally are representative of the external surface of object(s) and the earth.

In one embodiment, a DSM is converted to a DEM through the use of point cloud classification algorithms and rasterization algorithms to create a representation of the terrain surface without ground vegetation, tree vegetation, or anthropogenic surface features (e.g., cars, signs, buildings, fences, etc.). Anthropogenic surface modifications related to roads, paths, trenches are retained in the DEM. The result of the surface feature removal is referred to as a "bare-earth" model.

In one embodiment, a method includes: electro optical imagery collected from a UAV with enough forward and side image overlap to allow structure-from-motion (SFM) and multi-view stereopsis software to create a point cloud.

In one embodiment, geo-spatial control of GPS and an Inertial Measurement Unit (IMU) and imagery is added to the data obtained from LiDAR. Data is collected, and geo-references are used to relate the LiDAR and image data together into a single data set. One benefit is that this data results in a "colorized" LiDAR point cloud.

In one embodiment, LiDAR and image sensor data are collected. The data sets are geospatially correlated (to provide a geo-reference) as follows: GPS data that is collected (e.g., by the UAV/USV) provides positional control, and the IMU provides vector corrections for yaw, pitch and roll of the UAV (e.g., a UAS). Both GPS and IMU are mounted on the UAV/USV along with the sensors. This allows for correlation to "known survey control" (NGS, state plane, UTM, etc.) in order for mapping to be: repeatable; able to correlate data from multiple flights or multiple UAV; and able to correlate manual ground sample versus UAV/USV-produced data sets.

In one embodiment, the IMU is a unit in the electronics module of the UAV/USV which collects angular velocity and linear acceleration data. The IMU vector corrections, which are applied to GPS positions, describe the UAV/USV angular rate about each of the sensor axes. These vector corrections provide positional corrections for yaw, pitch and roll of the UAV/USV (e.g., a UAS) LiDAR data sets.

In one embodiment, the imagery collected from the UAV is processed using common computer software to create an orthomosaic of the terrain imagery and 3D point cloud using SFM analysis methods.

In all embodiments, the UAV can be replaced with fixed wing aircraft, helicopter, satellite, ground-based vehicle, or manned vessel for data collection.

In one embodiment, the process extracts 3D polylines and mass points from high-resolution 3D point cloud data. The conversion of the point cloud points to 3D polylines and mass points retains the essential details of original topography and reduces the file size by omitting redundant and coplanar elevation information using second order topographic derivatives and mass points to only retain the data that defines the surface. All other data that is unneeded is removed from the process and retained in the original DEM.

In one embodiment, the terrain imagery, LiDAR, and/or sonar data may be transferred from an aerial vehicle (e.g., a drone, a UAV/UAS, a helicopter, etc.) to a system (such as a computing device). In this embodiment, the transfer of data may be filtered, compressed, or otherwise manipulated using one or more methods discussed or mentioned herein before the transfer. For instance, processing equipment on board the aerial vehicle may perform one or more methods discussed or mentioned herein, such that the file size sent from the aerial vehicle is compressed relative to the raw file sizes associated with the terrain imagery, LiDAR, and/or sonar data.

In one embodiment, the process uses complex algorithms that assess vegetative and non-terrain anthropogenic features using slope, planarity, color and surface texture to automatically distinguish non bare-earth features from the point cloud topography data.

The disclosure includes methods and apparatuses which perform these methods, including systems which perform these methods, and computer readable media containing instructions which when executed on data processing systems cause the systems to perform these methods.

One aspect of the present disclosure is to extract 3D polylines (breaklines) from a ground surface point cloud that retain all of the essential terrain features (lossless compression). This compression is achieved by removing approximately 90% of redundant and coplanar elevation data while retaining non-coplanar elevation data (ridges, ravines, trenches, curbs, walls, etc.). One benefit of this compression algorithm is that mapping files can be produced that are significantly smaller (e.g., a data compression rate of between 10:1 and 20:1) depending on the terrain imaged and the desired detail in the final product, making them more usable in CAD programs for same-day results or even real-time or near real-time. The figure below illustrates how these algorithms provide usable digital terrain models from drone images that are very large and practically unusable.

Other features, advantages and gained efficiencies will be apparent from the detailed description which follows.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or another embodiment in the present disclosure are not necessarily references to the same embodiment.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A method for processing and creating a DTM from UAV/USV imagery or LiDAR measurements according to at least one embodiment of the present disclosure provides a compression algorithm by converting an unstructured point cloud into breaklines and mass points in order to retain a high degree of accuracy (virtually lossless) at an approximate 10-times (or greater) electronic file compression.

The resulting DTM features can be accessed by commercially available CAD and GIS software platforms to create a DTM and/or detailed contours of the terrain with a compressed electronic file size. The DTM can be used in CAD or GIS design programs that perform volumetric change detection that is more accurate than using a DEM. The DTM file does not retain the point cloud, but rather retains the essential components of the terrain surface via vectorized 3D polylines. A DTM is a vector data set typically composed of triangles made from regularly and irregularly spaced points. Breaklines ensure that triangular irregular network (TIN) edges align with pronounced convexities (ridges and hard edges) and concavities like drainages. A DTM offers an improvement over a DEM because a DTM stores the elevation information more efficiently.

DTM features (e.g., breaklines and mass points) are utilized by CAD or GIS software to create a DTM or a TIN from which bare-earth contour lines can be derived.

Figure 1A:
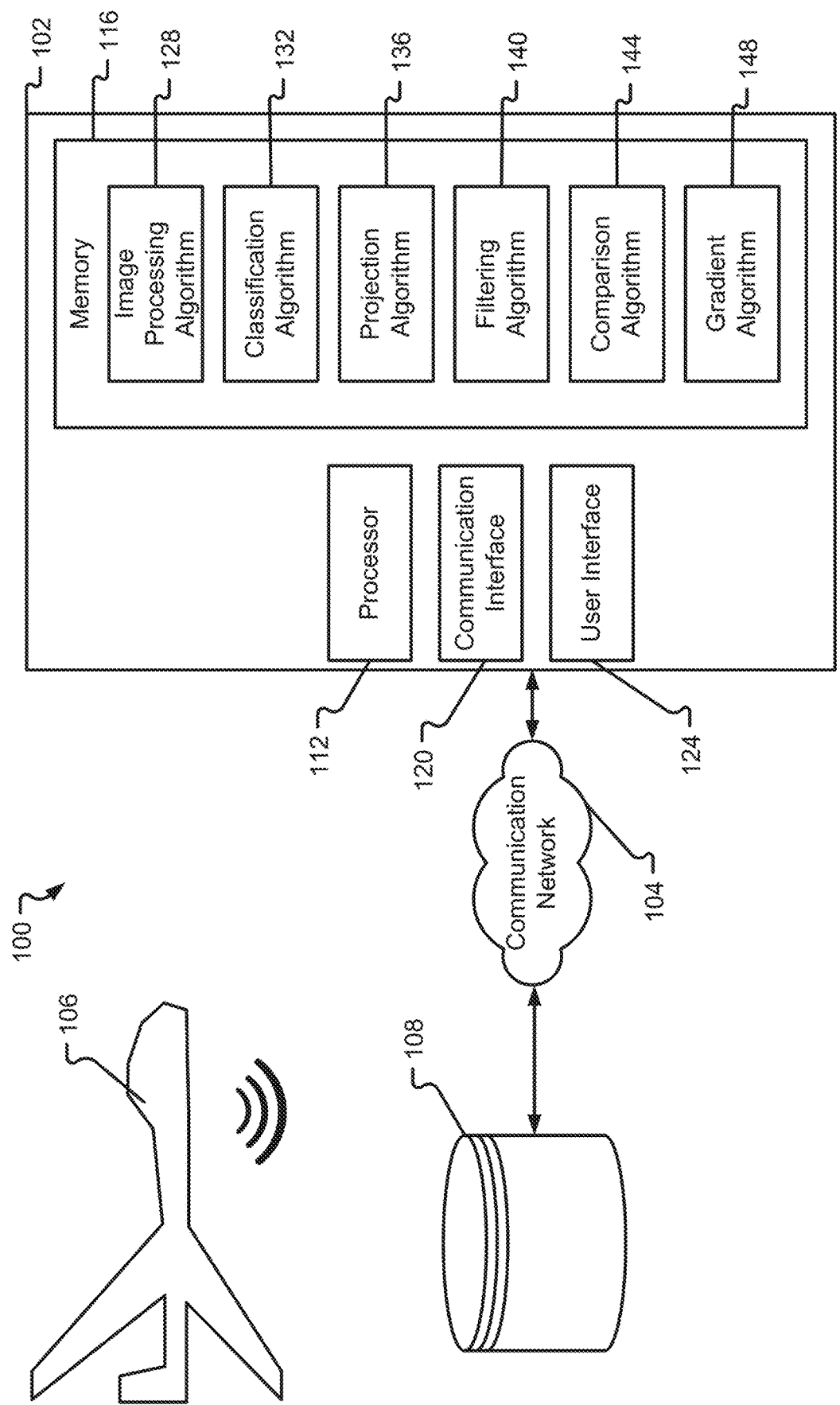
FIG. 1A shows aspects of a system according to at least one embodiment of the present disclosure.
Figure 1B:
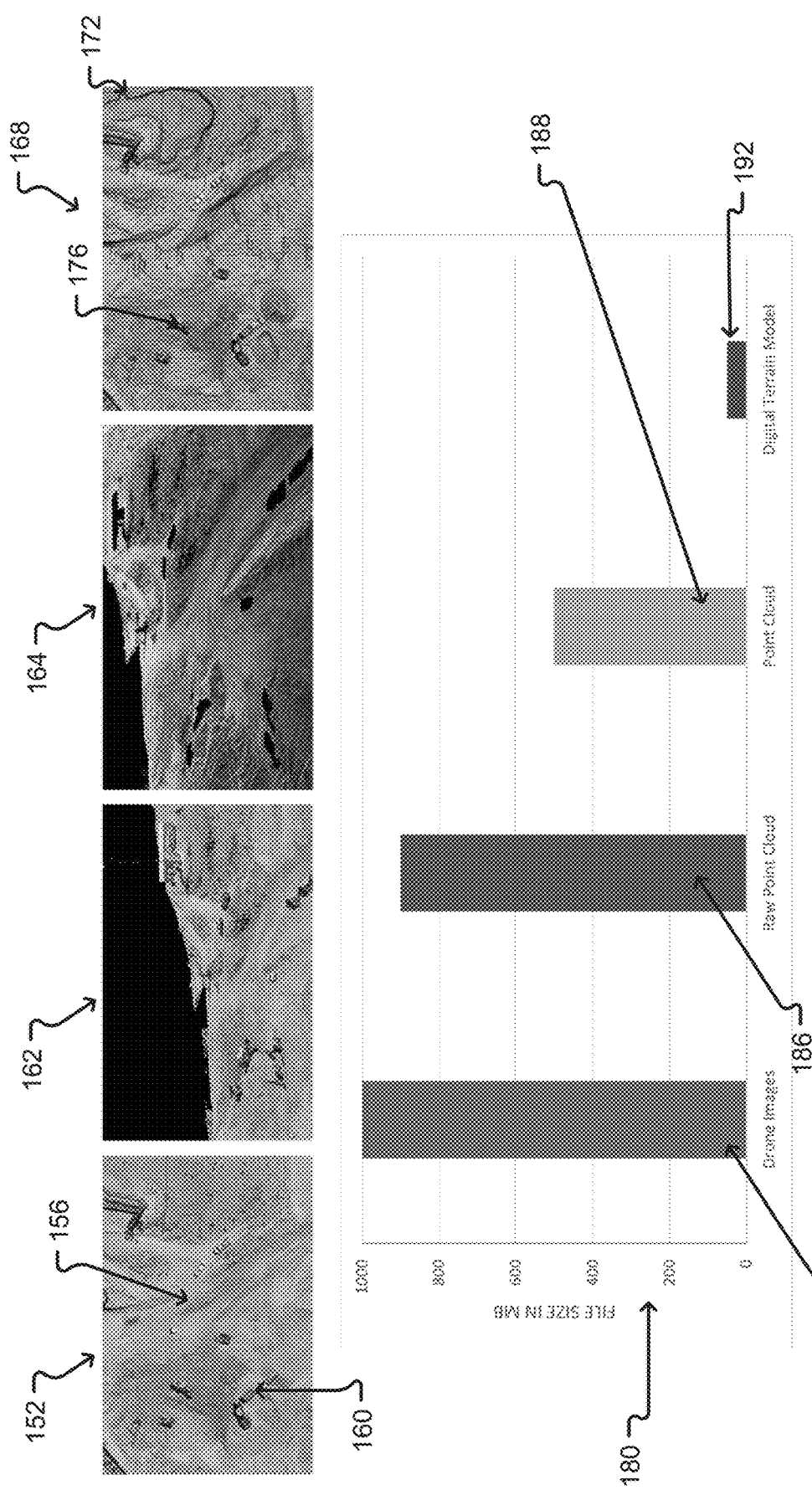
FIG. 1B shows a graphic depicting images at various stages of data processing and a chart depicting file size at various stages of data file processing in accordance with at least one embodiment of the present disclosure.

Turning first to FIGS. 1A-1B, aspects of a system 100 is shown in accordance with at least one embodiment of the present disclosure. The system may be used to performing point cloud cleaning; to remove data associated with non-terrain anthropogenic features from a point cloud; to capture, process, and/or render data associated with one or more data captures from a UAV/UAS; to extract 3D polylines and 3D mass points from a raster DEM to compress file size; and/or to carry out one or more other aspects of one or more of the methods disclosed herein. The system 100 is illustrated to include a computing device 102, a network 104, a vehicle 106, and a database and/or cloud storage device 108. Systems according to other embodiments of the present disclosure may comprise more or fewer components than the system 100. For example, the system 100 may not include one or more components of the computing device 102, the network 104, and/or the database 108.

The computing device 102 comprises a processor 112, a memory 116, a network interface 120, and a user interface 124. Computing devices according to other embodiments of the present disclosure may comprise more or fewer components than the computing device 102. In at least one embodiment, the computing device 102, or portions thereof, may be a part of or otherwise stored in a vehicle 106 (e.g., a drone, a UAV/UAS, a helicopter, an aircraft, a spacecraft, truck, All Terrain Vehicle (ATV), etc.). While FIG. 1A depicts an aerial vehicle, one or more other vehicles, including one or more ground vehicles, may be utilized for collecting data. The vehicle 106 may be or comprise sensor equipment capable of capturing, imaging, or otherwise obtaining information related to the topographical structure of an area of terrain. In some embodiments, the vehicle 106 may comprise one or more components of the system 100. For instance, the vehicle 106 may comprise the computing device 102 (and/or one or more components thereof), such that data processing may occur on the vehicle 106, with the resulting process data forwarded or sent to systems off board the vehicle 106 (e.g., a database 108 and/or related cloud, a user laptop, etc.). In some embodiments, the vehicle 106 may directly or indirectly communicate (e.g., via a proxy) with the database 108, such that the vehicle 106 is capable of offloading data into the database 108. In such embodiments, the database 108 may be configured to automatically store the data received from the vehicle 106 and forward the data (e.g., over the network 104) to a computing device or other device (e.g., a user laptop).

The processor 112 of the computing device 102 may be any processor described herein or any similar processor. The processor 112 may be configured to execute instructions stored in the memory 116, which instructions may cause the processor 112 to carry out one or more computing steps utilizing or based on data received from the UAV/UAS or other sensors, the network 104, the database 108, and/or one or more components thereof.

The memory 116 may be or comprise RAM, DRAM, SDRAM, flash memory, other solid-state memory, any memory described herein, or any other tangible, non-transitory memory for storing computer-readable data and/or instructions. The memory 116 may store information or data useful for completing, for example, any step of the methods 200, 300 and/or 400 described herein, or of any other methods. The memory 116 may store, for example, one or more image processing algorithms 128, one or more classification algorithms 132, one or more projection algorithms 136, one or more filtering algorithms 140, one or more comparison algorithms 144, and/or one or more gradient algorithms 148. Such instructions or algorithms may, in some embodiments, be organized into one or more applications, modules, packages, layers, or engines. The algorithms and/or instructions may cause the processor 112 to manipulate data stored in the memory 116 and/or received from or via the network 104 and/or the database 108. Additionally or alternatively, functionality provided by the various components of the memory 116 depicted and described herein can be provided by an artificial neural network or other type of machine learning model. Thus, while various components of the memory 116 are depicted as instructions, it should be appreciated that some or all of these components may be provided as an artificial neural network and may provide similar or the same functionality as the instructions described herein. In some embodiments, the computer-readable data may comprise the instructions and/or the machine learning models discussed herein (e.g., a neural network). For example, in embodiments where the system 100 comprises point cloud data, the point cloud data may be stored with the memory 116 and may, when processed (e.g., by the processor 112) may cause the processor to carry out any step of the methods 200, 300 and/or 400 discussed herein, or of any other method.

The computing device 102 may also comprise a communication interface 120. The communication interface 120 may be used for receiving image data or other information from an external source (such as the network 104, the database 108, and/or any other system or component not part of the system 100), and/or for transmitting instructions, images, or other information to an external system or device (e.g., another computing device 102, the network 104, the database 108, and/or any other system or component not part of the system 100). The communication interface 120 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 120 may be useful for enabling the computing device 102 to communicate with one or more other processors 112 or computing devices 102, whether to reduce the time needed to accomplish a computing-intensive task or for any other reason.

The computing device 102 may also comprise one or more user interfaces 124. The user interface 124 may be or comprise a keyboard, mouse, trackball, monitor, television, screen, touchscreen, and/or any other device for receiving information from a user and/or for providing information to a user. The user interface 124 may be used, for example, to receive a user selection or other user input regarding any step of any method described herein. Notwithstanding the foregoing, any required input for any step of any method described herein may be generated automatically by the system 100 (e.g., by the processor 112 or another component of the system 100) or received by the system 100 from a source external to the system 100. In some embodiments, the user interface 124 may be useful to allow a user (e.g., an engineer, a draftsman, an architect, etc.) to modify instructions to be executed by the processor 112 according to one or more embodiments of the present disclosure, and/or to modify or adjust a setting of other information displayed on the user interface 124 or corresponding thereto.

Although the user interface 124 is shown as part of the computing device 102, in some embodiments, the computing device 102 may utilize a user interface 124 that is housed separately from one or more remaining components of the computing device 102. In some embodiments, the user interface 124 may be located proximate one or more other components of the computing device 102, while in other embodiments, the user interface 124 may be located remotely from one or more other components of the computer device 102.

FIG. 1B depicts output images of one or more steps of one or more methods discussed herein, as well as a chart illustrating file size and usability associated with the output images. A drone image 152 may be images captured by, for example a UAV/UAS (e.g., a drone) during a flight over an area of land. As illustrated in the drone image 152, the image may depict both topographical land 156 as well as anthropogenic surface features 160 (e.g., trucks, buildings, etc.). Once processed to form a raw point cloud 162, the anthropogenic surface features may be removed using one or more methods discussed below, leaving a bare-earth point cloud 164, where only the land surface remains. The bare-earth point cloud 164 may then be further processed (e.g., using one or more methods mentioned below) to yield a DTM 168. The DTM 168 may depict 3D breaklines 172, as well as 3D point masses 176. The chart 180 of FIG. 1B also indicates the resulting file size as the images are processed. The file size associated with the drone images 184 may be large (e.g., 1000 MB), while the resulting raw point cloud file 186 and point cloud file 188 may be smaller (e.g., 900 MB and 500 MB, respectively). As the point cloud file is processed (e.g., according to one or more methods discussed herein), the file size may be further reduced (e.g., 50 MB) such that the final file size of the DTM 192 is much smaller than the original drone images 184.

Figure 2:
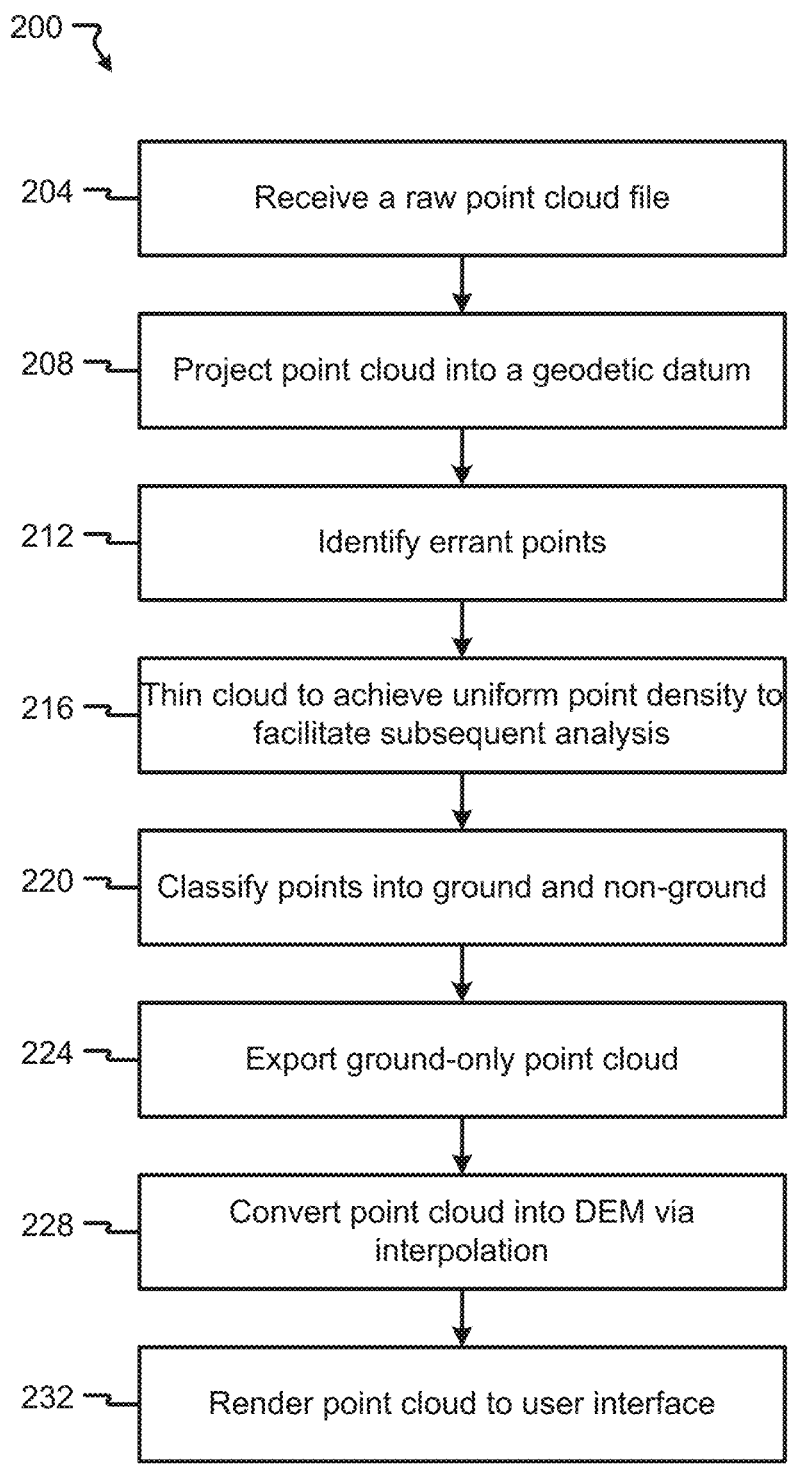
FIG. 2 depicts a method for point cloud cleaning according to at least one embodiment of the present disclosure.

FIG. 2 depicts a method 200 that may be used, for example, to clean a raw point cloud file derived from imagery, LiDAR or sonar to remove extraneous points that may create erroneous 3D polylines.

The method 200 (and/or one or more steps thereof) may be carried out or otherwise performed, for example, by at least one processor. The at least one processor may be the same as or similar to the processor(s) 112 of the computing device 102 described above. The at least one processor may be part of a UAV/UAS. A processor other than the processor described herein may also be used to execute the method 200. The at least one processor may perform the method 200 by executing instructions or data stored in a memory such as the memory 116. The instructions may correspond to one or more steps of the method 200 described below. The instructions may cause the processor to execute one or more algorithms, such one or more image processing algorithms 128, one or more classification algorithms 132, one or more projection algorithms 136, one or more filtering algorithms 140, one or more comparison algorithms 144, and/or one or more gradient algorithms 148.

The method 200 comprises receiving a raw point cloud file (step 204). The raw point cloud file may be or comprise data associated with captured images from an imaging device (e.g., images taken by a camera or other imaging device on a UAV or UAS during a flight) and/or sensor data (e.g., data generated from LiDAR and/or sonar systems on a UAV or UAS during a flight), or data or files derived therefrom. In some embodiments, the raw point cloud may be an unstructured point cloud file derived from captured images, LiDAR, and/or sonar scans. In some embodiments, the raw point cloud file may be created by one or more LiDAR processing software or by Structure From Motion (SFM) software.

The method 200 also comprises projecting the unstructured point cloud into a geodetic datum (step 208). The projection may be projected into both a user-defined geodetic horizontal coordinate datum (e.g., North American Datum 1988 (NAD 88)) and a vertical coordinate datum (e.g., North American Vertical Datum 1988 (NAVD 88)). In some embodiments, the unstructured point cloud already contain coordinate projections and/or datum information. For example, the formation of the raw point cloud file may be created to include coordinates or other information derived or extracted from the captured images, LiDAR, and/or sonar scans. In such embodiments, the unstructured point cloud may not be projected into the geodetic datum and may instead proceed in the method 200.

The method 200 also comprises identifying errant points (step 212). The errant point cloud points may be points that are not associated with the DSM points (e.g., blade strikes, water, multiple times around (MTA), etc.) using point cloud filtering routines. In some embodiments, a classification algorithm (e.g., an outlier detection algorithm, a noise detection algorithm, a last-return algorithm, etc.) may be used to classify the points in the point cloud into data associated with the scanned or imaged terrain and data not associated therewith (e.g., laser data related to from the bottom of rotor blades on an aerial vehicle, edges or portions of anthropogenic surface features, etc.). The classified errant points may then be removed to, for example, reduce the amount of noise associated with the point cloud.

The method 200 also comprises thinning the point cloud to achieve a uniform point density to facilitate subsequent analysis (step 216). The uniform point density may be achieved by numerically removing points within the DSM to achieve a uniform point density from areas of overlap or over-abundance of points related to the complexity of the point cloud DSM surface. The removed points may be redundant or extraneous data points. For instance, one or more areas of the point cloud with a point density above a threshold density may be pruned, with extraneous or redundant data removed. In some embodiments, the threshold density may be pre-determined (e.g., defined by a value stored in a database, a value entered by a user, etc.) and/or may be determined based on one or more other factors (e.g., size of terrain imaged, desired accuracy of the point cloud in describing the terrain, etc.).

The method 200 also comprises classifying points into bare-earth and non-bare-earth (step 220). The classification may occur through the use one or more classification algorithms. The classification algorithm may receive the thinned point cloud as an input, and a filtered point cloud identifying each point in the point cloud as either bare-earth or non-bare-earth. While classifications algorithms are used here, additional or alternative algorithms may be used to further distinguish the data between bare-earth data and non-bare-earth data (e.g., K-Nearest Neighbors (KNN), Support Vector Machines (SVM), Logistic Regression, etc.).

The method also comprises exporting the bare-earth point cloud (step 224). Once the point cloud comprises bare-earth points only, the point cloud may be exported. The point cloud may be exported to, for example, one or more computing devices (e.g., a computing device 102), one or more memories (e.g., a memory 116), one or more databases and/or cloud storage devices (e.g., a database 108), and/or to or across one or more networks (e.g., a network 104) or other servers or networks. In some embodiments, the bare-earth point cloud may comprise less data than the original point cloud, beneficially enabling the traffic data passed between devices on the cloud network (e.g., the database 108 and the computing device 102) from unnecessarily transferring excess or extraneous data.

The method 200 also comprises converting the exported point cloud into a DEM via interpolation (step 228). The step 228 may make use of one or more algorithms to convert the exported point cloud (i.e., a 3D collection of points) into a raster device (i.e., a 2D grid of pixels). For instance, an algorithm may receive the exported point cloud and may map the point cloud data into a 2D grid. In some embodiments, the pixel value associated with the 2D grid may be associated with elevation of the mapped point cloud data (as opposed to, for example, a color value or property). In some embodiments, the width of each pixel may be fixed, such that a single pixel may correspond to elevation values of a single cloud point, multiple cloud points, or no cloud points. In some embodiments, the algorithm may use various interpolation methods in assigning the elevation value of the pixel. For example, in a pixel representing multiple cloud points, the algorithm may use the highest elevation associated with the multiple cloud points, the lowest elevation associated with the multiple cloud points, an average elevation of the multiple cloud points, a cubic mean elevation of the multiple cloud points, a bi-cubic interpolation of the multiple cloud points to determine an average, etc.

The method 200 also comprises rendering the point cloud to a user interface (step 232). The step 232 may comprise rasterizing the point cloud to a user defined grid to facilitate the rendering of the point cloud to the user interface. The rendering of the compressed/filtered point cloud file may beneficially enable a user to render the point cloud to a CAD file or on a system (e.g., a computer) to view the point cloud (e.g., to assist with construction planning/zoning) without experiencing the issues associated with a much larger file (e.g., program freezes/crashes, improved wait time associated with loading the file, etc.).

The present disclosure encompasses embodiments of the method 200 that comprise more or fewer steps than those described above, and/or one or more steps that are different than the steps described above.

Figure 3:
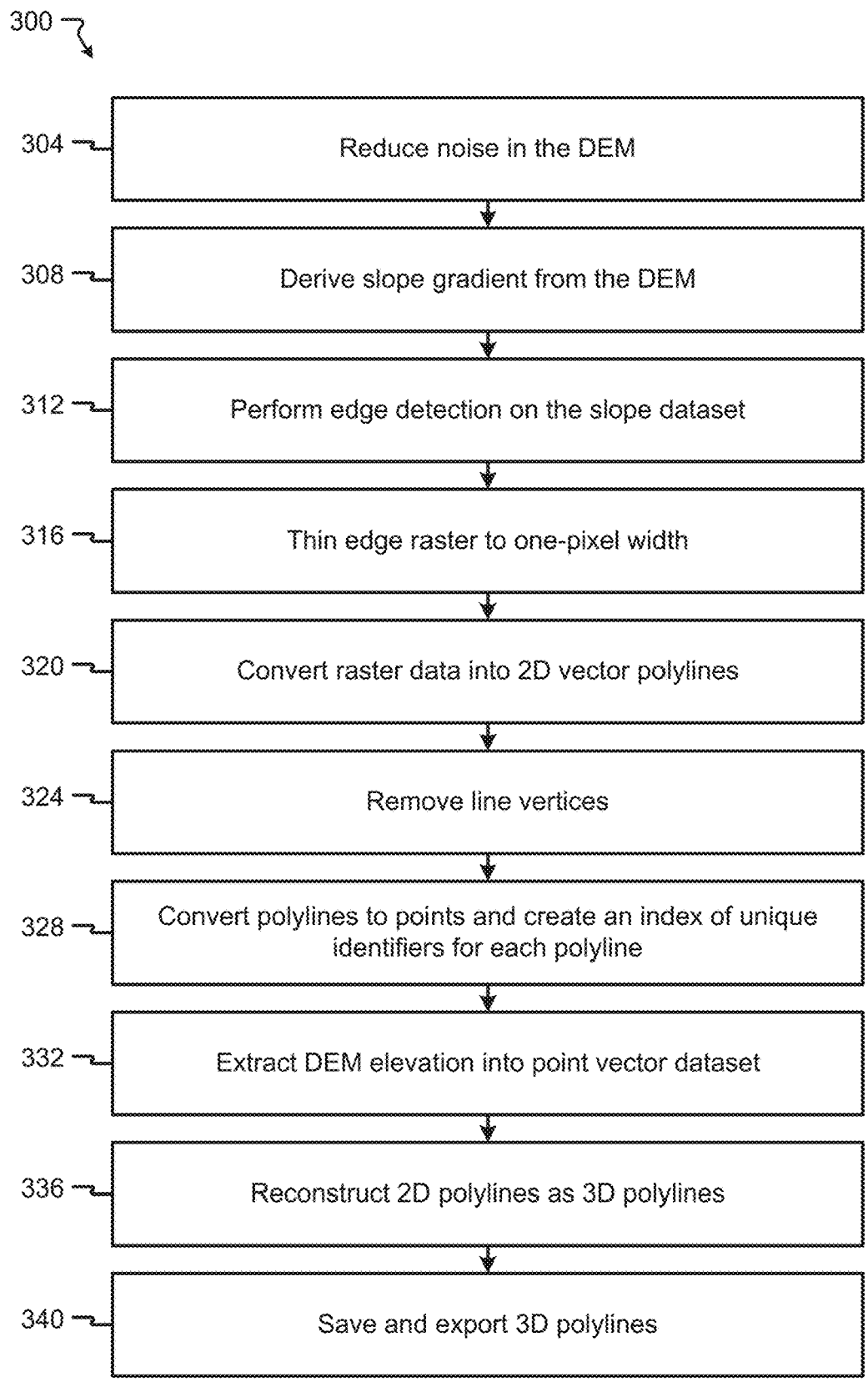
FIG. 3 depicts a method for 3D polyline DTM feature extraction according to at least one embodiment of the present disclosure.

FIG. 3 depicts a method 300 that may be used, for example, to extract a series of 3D polylines and points from a raster grid such as a raster grid discussed in the step 232. In some embodiments, the extraction of the 3D polylines and points from the point clouds may result in a reduction of data associated with the point cloud that is required to be stored within databases or servers by storing only the 3D polylines and the points. The reduction of data also beneficially improves the functionality of computer technology by reducing the amount of network traffic bandwidth the computer must allocate to receive and process the point cloud. In some embodiments, the extraction may result in a 10-times lossless compression of the DEM.

The method 300 (and/or one or more steps thereof) may be carried out or otherwise performed, for example, by at least one processor. The at least one processor may be the same as or similar to the processor(s) 112 of the computing device 102 described above. The at least one processor may be part of a UAV/UAS. A processor other than the processor described herein may also be used to execute the method 300. The at least one processor may perform the method 300 by executing instructions or data stored in a memory such as the memory 116. The instructions may correspond to one or more steps of the method 300 described below. The instructions may cause the processor to execute one or more algorithms, such one or more image processing algorithms 128, one or more classification algorithms 132, one or more projection algorithms 136, one or more filtering algorithms 140, one or more comparison algorithms 144, and/or one or more gradient algorithms 148.

The method 300 also comprises reducing noise in the DEM (step 304). In some embodiments, the noise reduction may be achieved by using an edge preserving filter that evaluates the variance in 16 direction around each raster cell to remove noise. An example of the edge preserving filter that can be used with any one or more of the embodiments disclosed herein is:

1. C. Ju. An Edge-Enhanced Modified Lee Filter for the Smoothing of SAR Image Speckle Noise, *International Workshop on Acoustic Signal Enhancement*, NF, Canada, 1981.

Which is incorporated herein by reference in its entirety. The algorithm mentioned in this paper scans the raster DEM input file using an 8-neighbor moving window to evaluate the elevation variance in 16 directions (N, NNE, NE, NEE, etc.) around each cell. From this, the direction of the minimum variance is measured, and a Lee Filter is performed in that direction to remove noise and smooth the elevation raster, resulting in another DEM raster dataset for use in additional processing steps. Such algorithms may be implemented on point cloud derived data to remove noise from the associated dataset.

The method 300 also comprises deriving a slope gradient from the DEM (step 308). In some embodiments, one or more algorithms may be used to derive the slope gradient. For instance, the algorithm may implement a nine parameter $2^{nd}$ order polynomial method on an eight grid cell neighborhood of a rasterized point cloud (such as a rasterized point cloud from the step 232). The input data may be a smoothed DEM (e.g., a reduced-noise DEM generated in the step 304), and the output may be a dataset representing the slope angle of the DEM, which may be further processed as discussed in the subsequent method steps of the method 300 below.

The method 300 also comprises performing edge detection on the slope dataset (step 312). In some embodiments, one or more algorithms may be used to detect the edges of the slope dataset (such as the slope dataset constructed in the step 308). An example of an algorithm that can be used with any one or more of the embodiments disclosed herein is:

1. E. Bourennane. Generalization of Canny-Deriche Filter for Detection of Noisy Exponential Edge, *Signal Processing*, Dijon Cedex, France, 2002.

Which is incorporated herein by reference in its entirety. The algorithm mentioned in this paper may use an 8-grid cell Gaussian filter, based on a user-defined operator scale and a gradient threshold to identify edges. In some embodiments, the algorithm may receive an input dataset comprising a slope angle raster and may output a raster dataset of slope "edges" (i.e., second derivatives of the elevation values). The edges may form the basis of the breaklines described in one or more methods discussed herein.

The method 300 also comprises thinning the raster edge file to a single pixel width (step 316). In some embodiments, the method 300 may make use of one or more algorithms to thin the raster edge file. An example of an algorithm that can be used with any one or more of the embodiments disclosed herein is:

1. A. Widiarti. Comparing Hilditch, Rosenfeld, Zhang-Suen, and Nagendraprasad-Wang-Gupta Thinning, *World Academy of Science, Engineering and Technology International Journal of Computer and Information Engineering*, Amsterdam, The Netherland, 2011.

Which is incorporated herein by reference in its entirety. This algorithm utilizes a "skeletonization" algorithm that that removes the adjoining pixels while retaining the original shape of the edge object. The thinning of the raster edge file may beneficially enable the resulting vector data to be processed in subsequent steps of the method 300.

The method 300 also comprises converting the raster data into 2D vector polylines (step 320). In some embodiments, the "skeletonized" raster data (i.e., the thinned raster edge file) may be converted into 2D vector polylines by creating vertices and polyline segments from the raster cells.

The method 300 also comprises removing line vertices (step 324). In some embodiments, the vertices may be removed based on a user-defined minimum distance value (e.g., 6 inches). In at least one embodiment, the vertices may be or comprise the vertices generated in the skeletonized raster data constructed in the step 320. In some embodiments, the step 324 may utilize one or more algorithms to remove the line vertices. In at least one embodiment, the method 300 may utilize a simplification algorithm, which may prune the vertices. For instance, the algorithm may examine three vertices at a time to determine if the three vertices are linear, within a pre-defined tolerance. If the three vertices are within the tolerance, they are defined as linear, and the middle vertex is removed. If the three vertices are not within the tolerance, the middle vertex is not removed, and the algorithm continues to the next three vertices. As such, the algorithm may receive, as an input, the 2D vector polylines and may output generalized 2D polylines with fewer vertices and therefore a smaller file size for ease of use in, for example, CAD software. This beneficially improves computer functionality by allowing the CAD software to open up the polylines that the software may be otherwise unable to open (e.g., due to excessive file size).

The method 300 also comprises converting polylines to points and creating an index of unique identifiers for each polyline (step 328). The vertices from each of the 2D polylines may be extracted into a point vector file, and an index of unique identifiers may be created. The unique identifiers may be used to identify each original polyline segment, as well as a vertex order within the polyline segment. For example, each polyline may be assigned a number, and each vertex may be a subset of each 2D polyline (e.g., polyline 25 may have vertices 1 through 560, indicating that the algorithm acting on polyline 25 generated 560 vertices, each of which is subsequently labeled). In some embodiments, one or more algorithms receive data associated with the 2D polylines and vertices as an input may identify each data and each vertex associated therewith and output a point vector file containing information related to the labeling of each 2D polyline and each vertex.

The method 300 also comprises extracting a DEM elevation value into a point vector dataset (step 332). The step 332 may utilize one or more algorithms to extract the DEM elevation values for each of the points created from the polylines using, for example, b-spline interpolation. In such embodiments, a DEM elevation value for each of the points may be determined and saved into a file. In b-spline interpolation, the algorithm may take in the DEM elevation values as an input, may use interpolation to fill in areas without point cloud data, and may output a point vector dataset. In some embodiments, a grade associated with the DEM elevation points running along the perimeter of any area without point cloud data is extended into the area and blended smoothly with the remaining perimeter points. In such embodiments, the b-spline interpolation algorithm may utilize predictions in estimating the elevation points in the area of the point cloud lacking data.

The method 300 also comprises reconstructing the 2D polylines as 3D polylines (step 336). In some embodiments, the 2D polylines may be reconstructed as 3D polylines based on or otherwise using the polyline and vertex order identifiers (e.g., the data determined in the step 328) as well as the elevation values extracted from the DEM dataset (e.g., the data determined in the step 332). In some embodiments, the step 336 may use one or more algorithms that receive the polyline and vertex order identifiers and the elevation values as an input, may match up the elevation data with each vertex to provide elevation data associated with each vertex, and may output a 3D polyline dataset of breaklines.

The method 300 also comprises saving and exporting the 3D polyline file (step 340). In some embodiments, the 3D polyline file may be saved and exported in, for example, GIS shapefile format. Such a format may allow an end user to open, export, or otherwise utilize the 3D polyline file in a software application (e.g., CAD, GIS, etc.)

The present disclosure encompasses embodiments of the method 300 that comprise more or fewer steps than those described above, and/or one or more steps that are different than the steps described above.

Figure 4:
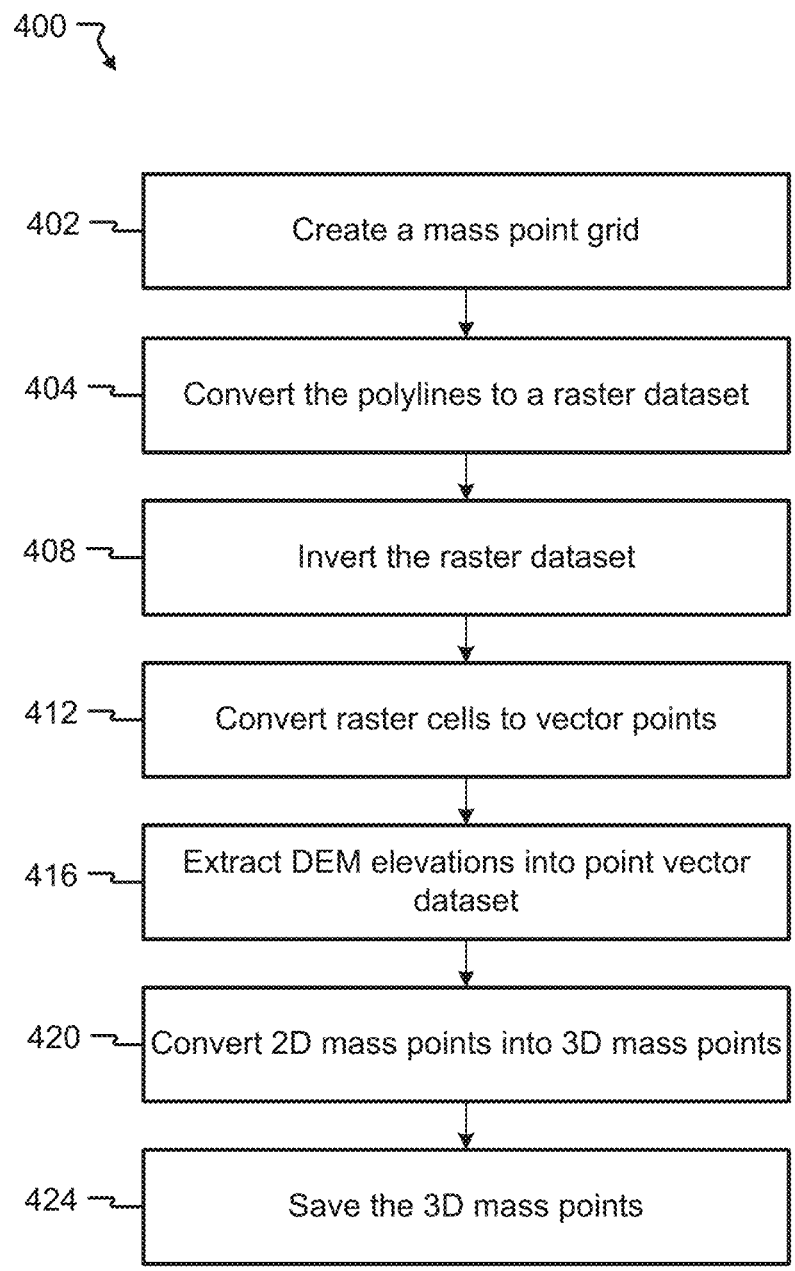
FIG. 4 depicts a method for 3D point DTM feature extraction according to at least one embodiment of the present disclosure.

FIG. 4 depicts a method 400 that may be used, for example, to fill in planar or gradually changing terrain areas that may be left empty or are otherwise unfilled when the 3D polylines are defined. More specifically, the 3D polylines may define the breaklines in the topography but may leave the planar or the gradually changing terrain areas empty. The empty areas can be represented by "mass points" that are used in conjunction with the 3D polylines to create a DTM (which may be a variant of a Delaunay tessellation or TIN).

The method 400 (and/or one or more steps thereof) may be carried out or otherwise performed, for example, by at least one processor. The at least one processor may be the same as or similar to the processor(s) 112 of the computing device 102 described above. The at least one processor may be part of a UAV/UAS. A processor other than the processor described herein may also be used to execute the method 400. The at least one processor may perform the method 400 by executing instructions or data stored in a memory such as the memory 116. The instructions may correspond to one or more steps of the method 400 described below. The instructions may cause the processor to execute one or more algorithms, such one or more image processing algorithms 128, one or more classification algorithms 132, one or more projection algorithms 136, one or more filtering algorithms 140, one or more comparison algorithms 144, and/or one or more gradient algorithms 148.

The method 400 comprises creating a mass point grid (step 402). The mass point grid may be constructed as an overall grid of equally spaced points over the entire area of interest (which may be the terrain associated with the imagery, LiDAR, and/or sonar data). The desired mass point spacing may be or be based on a pre-defined value (e.g., by a user, by a value in a database, etc.) such that the areas not defined by breaklines can be filled in with data. In some embodiments, the raster dataset provides a grid of points with regular spacing (as defined, for example, by the user), permitting for subsequent inversion to identify areas where additional mass points are required.

The method 400 also comprises converting the 3D polylines to a raster dataset (step 404). The raster dataset may be defined by a cell size of the DEM. In some embodiments, the step 404 may use an algorithm that receives the 3D polylines and a cell size as inputs and may output a raster dataset.

The method 400 also comprises inverting the raster dataset (step 408). The inversion of the raster dataset may switch the data/no-data values to ensure that the mass points are not collocated with the 3D polylines.

The method 400 also comprises converting the raster cells into vector points (step 412). The conversion from raster cells to vector points allows for the mass points to be represented as vectors, with each point of the mass points providing a defined breakline (i.e., each mass point defines a breakline with a single point).

The method 400 also comprises extracting elevation data from the DEM into a point vector dataset (step 416). The extraction may be performed by one or more algorithms, such as an algorithm that uses b-spline interpolation to extract the data from the DEM. In some embodiments, the step 416 may use an algorithm similar to or the same as the algorithm used in the step 332.

The method 400 also comprises converting the 2D mass points into 3D mass points (step 420). The converting may include data extracted from the DEM elevations, as well as the extracted vector points to generate the 3D mass points. In some embodiments, the step 420 may use algorithms that are similar to or the same as the algorithms used in the steps 320, 328, 332, and/or 336. In other words, point vector set containing the 2D mass points may be compared to the DEM and an elevation value assigned to each of the 2D cells to provide the additional third dimension, transforming the 2D mass points into 3D mass points.

The method 400 also comprises saving the 3D mass points (step 424). The 3D mass points may be stored in a 3D shapefile format, which may facilitate the creation of the DTM in a software program (e.g., CAD, GIS, etc.). For instance, the mass points may be combined with the 3D polylines (e.g., generated using the method 300), to provide a compressed DTM file or facilitate the creation of a DTM file in a software program.

The present disclosure encompasses embodiments of the method 400 that comprise more or fewer steps than those described above, and/or one or more steps that are different than the steps described above.

Figure 5:
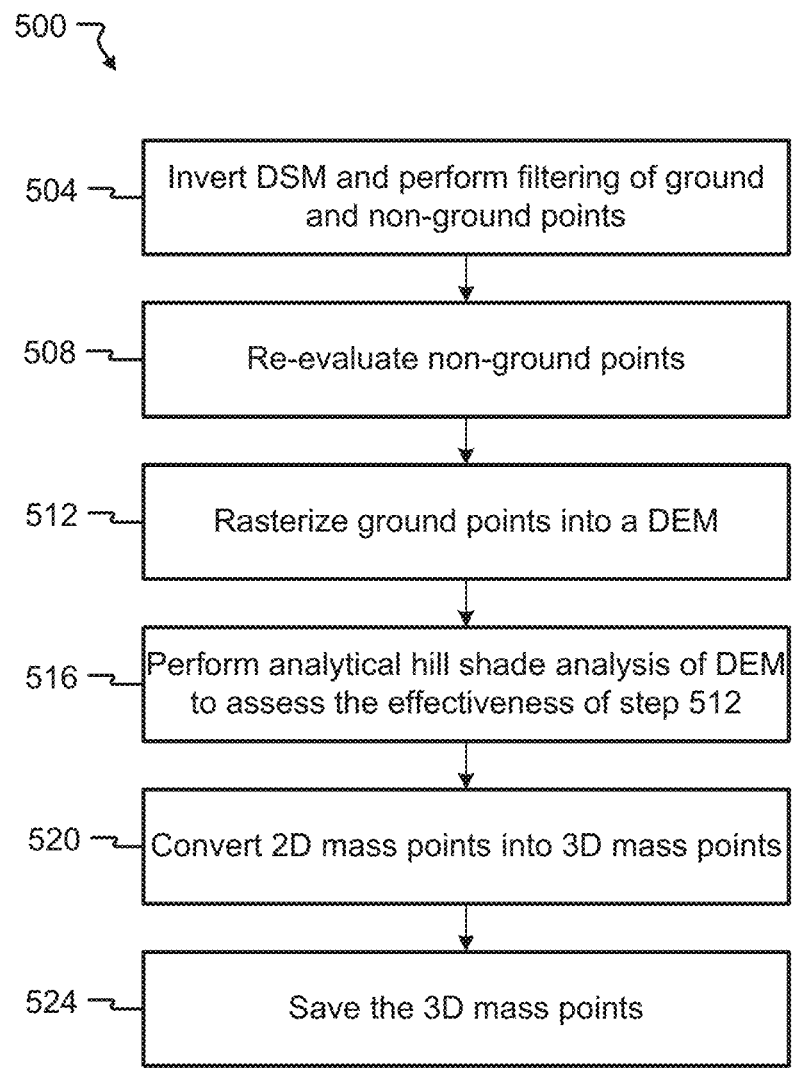
FIG. 5 depicts a method for point cloud cleaning of vegetative and non-terrain anthropogenic features according to at least one embodiment of the present disclosure.

FIG. 5 depicts a method 500 that may be used, for example, to differentiate non-ground points from ground points. The method 500 may be used in some embodiments as a complement to or in place of classification algorithms designed to classify points in a point cloud as either ground or non-ground points. In some embodiments, the method 500 may be used on raw point cloud files that contain both ground and non-ground points.

The method 500 (and/or one or more steps thereof) may be carried out or otherwise performed, for example, by at least one processor. The at least one processor may be the same as or similar to the processor(s) 112 of the computing device 102 described above. The at least one processor may be part of a UAV/UAS. A processor other than the processor described herein may also be used to execute the method 500. The at least one processor may perform the method 200 by executing instructions or data stored in a memory such as the memory 116. The instructions may correspond to one or more steps of the method 500 described below. The instructions may cause the processor to execute one or more algorithms, such one or more image processing algorithms 128, one or more classification algorithms 132, one or more projection algorithms 136, one or more filtering algorithms 140, one or more comparison algorithms 144, and/or one or more gradient algorithms 148.

The method 500 comprises inverting a DSM and filtering the ground and non-ground points (step 504). The filtering of the ground and non-ground points may be performing using, for example, a cloth simulation filter algorithm (CSF). An example of a CSF that can be used with any one or more of the embodiments disclosed herein is:

1. J. Weil. The Synthesis of Cloth Objects, SIGGRAPH Comput. Graph., 1986. Which is incorporated herein by reference in its entirety. The CSF routine uses prior art of cloth simulation algorithm of the inverted point cloud to simulate the surrounding topography using parameters of degree of topographic relief, simulation iterations and ground/non ground threshold to identify removal of the vegetation and non-terrain anthropogenic features from the point cloud. By inverting the DSM, the bottom values of the DSM (which may correspond to the ground) become the top values of the DSM, allowing a CSF algorithm to more easily identify the ground points.

The method 500 also comprises re-evaluating the non-ground points (step 508). The re-evaluation may comprise evaluating the non-ground points based on, for example, color, geometric and/or morphometric criteria. In some embodiments, one or more eigenvector-based linear transformations may be applied to the non-ground points to reclassify false positives back to ground points. In some embodiments, the step 508 may utilize an algorithm that checks for a color match between the edges of the non-ground points and the ground points and returns non-ground points that are actually ground points to the group of ground points.

The method 500 also comprises rasterizing ground points into a DEM (step 512). The ground points may be rasterized into a DEM, and may be additionally de-noised (e.g., using a Lee Filter). In some embodiments, any data gaps (e.g., caused by removing non-ground points from the point cloud) may be filed using spline functions. For instance, an algorithm may receive the DEM data as an input, and may output the DEM data with gaps in data filled by splining known points together (e.g., via data interpolation or smoothing).

The method 500 also comprises performing analytical hill shade analysis of the DEM (step 516). The analytical hill shade may permit for the visual assessment (e.g., by a user) of the effectiveness of the rasterization of the ground points. For instance, the user may cause one or more algorithms to perform one or more analytical hill shade processes, with the result displayed on a user interface. The hill shade process may, for example, simulate light shining on the DEM, permitting high-contrast ridges (rather than color gradients) to be rendered to the user interface. This may beneficially enable, for example, the user to gain a better sense of the data depicted by the DEM.

If the algorithm that completes the DEM data using spline function fails to adequately fill in data gaps, the resulting DEM may be visually distorted when the hill shade is rendered to a user interface, allowing the user to know that the spline function inadequately filled in the data gaps in the step 512. The step 512 may then be performed again (e.g., using different spline functions, using different spline parameters, etc.) to improve the data gaps in the DEM.

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 2, 3, 4, and 5 (and corresponding description of the methods 200, 300, 400, and 500), as well as methods that include additional steps beyond those identified in FIGS. 2, 3, 4, and 5 (and corresponding description of the methods 200, 300, 400, and 500). The present disclosure also encompasses methods that comprise one or more steps from one method described herein, and one or more steps from another method described herein.

As used herein, slope gradient is the change in the elevation value (delta Z) per unit of change in the horizontal distance (X and Y axes). Slope is defined as the change in elevation per unit distance along the path of steepest ascent or descent from a raster grid cell to one of its eight immediate neighbors, expressed as the arctangent Additionally, the processes have been described above as a series of steps. However, one or more of the steps can be optional and may be skipped. Additionally, the steps can be performed in a different order than described above.

Benefits, other advantages, and solutions to problems have been described herein regarding specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December 2013); IEEE 802.11ad ("IEEE P802.11ad-2012, IEEE Standard for Information Technology—Telecommunications and Information Exchange Between Systems— Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11y Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a drone, a communications enabled drone or UAV, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHh and 300 GHz, a WLAN frequency band, a WPAN frequency band, a frequency band according to the WGA specification, and the like.

While the above provides just some simple examples of the various device configurations, it is to be appreciated that numerous variations and permutations are possible.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, or within a dedicated secured, unsecured, and/or encrypted system and/or within a network operation or management device that is located inside or outside the network.

Thus, it should be appreciated that the components of the system can be combined into one or more devices, or split between devices. As will be appreciated from the following description, and for reasons of computational efficiency, the components of the system can be arranged at any location within the environment without affecting the operation thereof.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

The systems and methods disclosed herein can also be implemented as instructions on a computer-readable information storage media that when executed by one or more processors cause to be performed any of the above aspects disclosed herein.

A system on a chip (SoC) including any one or more of the above aspects disclosed herein.

One or more means for performing any one or more of the above aspects disclosed herein.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a data processing r image processing network. As will be appreciated from the following description, and for reasons of computational efficiency, the components of the system can be arranged at any location within a distributed network without affecting the operation of the system.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, an image processing or big data processing device, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a server.

It is therefore apparent that there has at least been provided systems and methods for improved image data processing. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method to automatically generate a Digital Terrain Model (DTM), the method comprising:
    receiving a raw point cloud file, wherein the raw point cloud file has been classified with a plurality of ground points;
    converting the plurality of ground points into a Digital Elevation Model (DEM);
    closing any gaps in the DEM using a spline interpolation;
    applying one or more filters to reduce noise in the DEM;
    applying a process to the DEM which implements a nine-parameter $2^{nd}$-order polynomial method on an eight-grid cell neighborhood of pixels to create a slope-gradient raster;
    performing edge detection on the slope-gradient raster to produce pixels in linear patterns which represent features where slope changes;
    applying a skeletonization process that removes adjoining pixels while retaining an original shape of edge features to produce a skeletonized raster dataset;
    converting the skeletonized raster dataset into a plurality of 2D vector polylines, of which each pixel represents a vertex in a polyline;
    performing a filtering on each of the plurality of 2D polylines to reduce a number of vertices defining the polylines while retaining the overall shape of the 2D polylines;
    assigning an elevation from the DEM to each of the vertices in the plurality of 2D polylines thereby converting them into a plurality of 3D polylines;
    exporting each of the plurality of 3D polylines to a first shapefile to be used in creation of a DTM;
    creating a first raster dataset from newly created 3D polylines;
    inverting the first raster dataset;
    using the inverted first raster dataset as a mask to create a second raster dataset of equally spaced points in a grid over the entire DEM;
    converting cells of the second raster dataset into 2D vector points;
    converting the 2D vector points into 3D vector points by extracting DEM elevations into a vector point dataset; and
    exporting the 3D vector points into a second shapefile to be used in creation of a DTM, wherein the first exported shapefile and the second exported shapefile used together are components of the DTM.

2. The method of claim 1, wherein the method further comprises:
    rendering the DTM to a user interface.

3. A system for automatically generating a Digital Terrain Model (DTM), the system comprising:
    a processor; and
    a memory storing data thereon that, when the data are accessed by the processor, cause the processor to:
    receive a raw point cloud file, wherein the raw point cloud file has been classified with a plurality of ground points;
    convert the plurality of ground points into a Digital Elevation Model (DEM);
    close any gaps in the DEM using a spline interpolation;
    apply one or more filters to reduce noise in the DEM;
    apply a process to the DEM which implements a nine-parameter $2^{nd}$-order polynomial method on an eight-grid cell neighborhood of pixels to create a slope-gradient raster;
    perform edge detection on the slope-gradient raster to produce pixels in linear patterns which represent features where slope changes;
    apply a skeletonization process that removes adjoining pixels while retaining an original shape of edge features to produce a skeletonized raster dataset;
    convert the skeletonized raster dataset into a plurality of 2D vector polylines, of which each pixel represents a vertex in a polyline;
    perform a filtering on each of the plurality of 2D polylines to reduce a number of vertices defining the polylines while retaining the overall shape of the 2D polylines;
    assign an elevation from the DEM to each of the vertices in the plurality of 2D polylines thereby converting them into a plurality of 3D polylines;

export each of the plurality of 3D polylines to a first shapefile to be used in creation of a DTM;
create a first raster dataset from newly created 3D polylines;
invert the first raster dataset;
use the inverted first raster dataset as a mask to create a second raster dataset of equally spaced points in a grid over the entire DEM;
convert cells of the second raster dataset into 2D vector points;
convert the 2D vector points into 3D vector points by extracting DEM elevations into a vector point dataset; and
export the 3D vector points into a second shapefile to be used in creation of a DTM, wherein the first exported shapefile and the second exported shapefile used together are components of the DTM.

4. The system of claim 3, wherein the data further cause the processor to:
render the DTM to a user interface.

5. A system for automatically generating a Digital Terrain Model (DTM), the system comprising:
an unmanned aerial vehicle (UAV);
a processor; and
a memory storing data thereon that, when the data are accessed by the processor, cause the processor to:
receive a raw point cloud file, wherein the raw point cloud file has been classified with a plurality of ground points;
convert the plurality of ground points into a Digital Elevation Model (DEM);
close any gaps in the DEM using a spline interpolation;
apply one or more filters to reduce noise in the DEM;
apply a process to the DEM which implements a nine-parameter $2^{nd}$-order polynomial method on an eight-grid cell neighborhood of pixels to create a slope-gradient raster;
perform edge detection on the slope-gradient raster to produce pixels in linear patterns which represent features where slope changes;
apply a skeletonization process that removes adjoining pixels while retaining an original shape of edge features to produce a skeletonized raster dataset;
convert the skeletonized raster dataset into a plurality of 2D vector polylines, of which each pixel represents a vertex in a polyline;
perform a filtering on each of the plurality of 2D polylines to reduce a number of vertices defining the polylines while retaining the overall shape of the 2D polylines;
assign an elevation from the DEM to each of the vertices in the plurality of 2D polylines thereby converting them into a plurality of 3D polylines;
export each of the plurality of 3D polylines to a first shapefile to be used in creation of a DTM;
create a first raster dataset from newly created 3D polylines;
invert the first raster dataset;
use the inverted first raster dataset as a mask to create a second raster dataset of equally spaced points in a grid over the entire DEM;
convert cells of the second raster dataset into 2D vector points;
convert the 2D vector points into 3D vector points by extracting DEM elevations into a vector point dataset; and
export the 3D vector points into a second shapefile to be used in creation of a DTM, wherein the first exported shapefile and the second exported shapefile used together are components of the DTM.

6. The system of claim 5, wherein the data further cause the processor to:
render the DTM to a user interface.

* * * * *